July 25, 1933.  W. E. RYDER ET AL  1,919,532
INSULATING COVERING
Filed Jan. 4, 1929    2 Sheets-Sheet 1
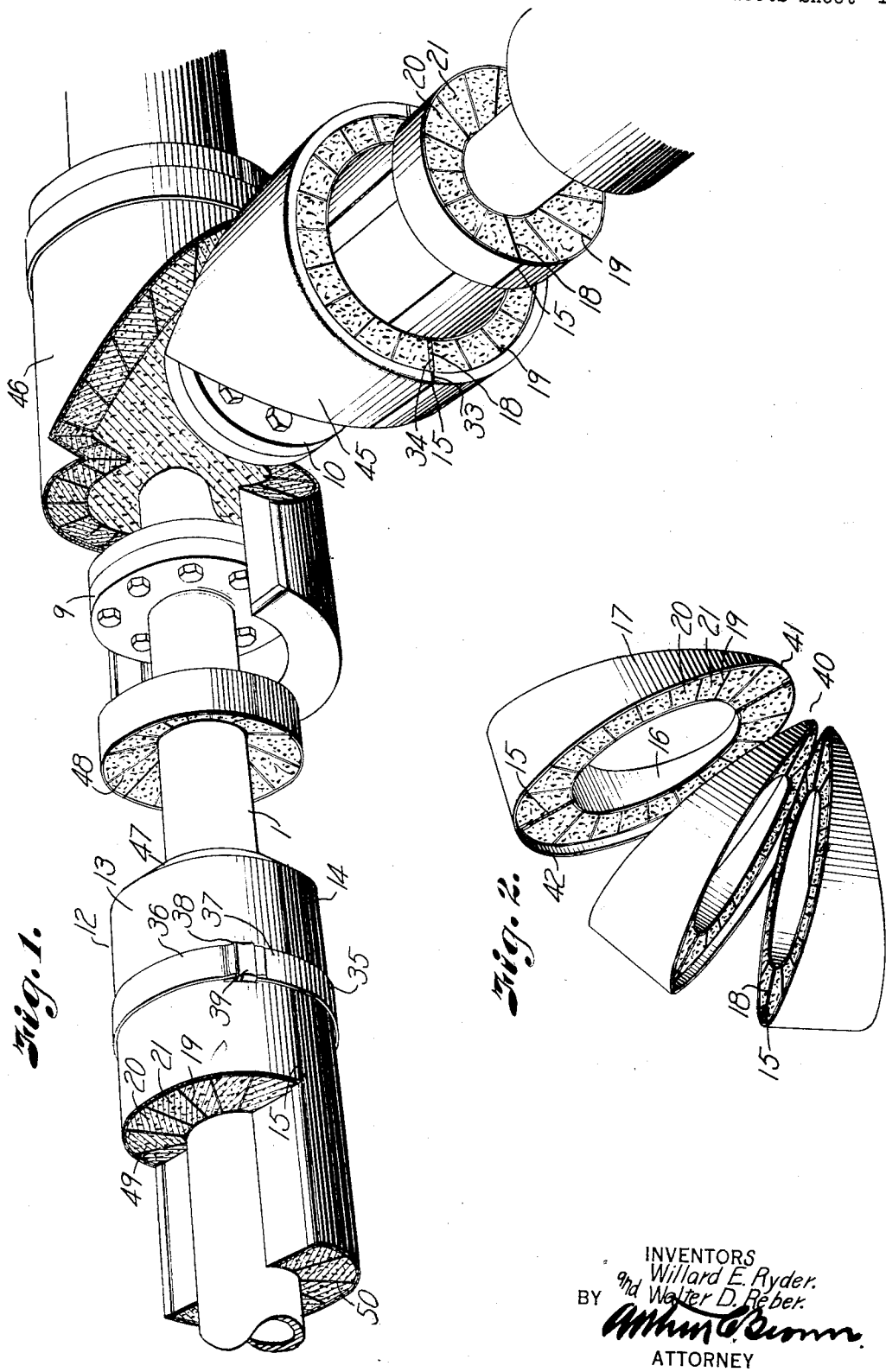
INVENTORS
Willard E. Ryder.
and Walter D. Reber.
BY
ATTORNEY July 25, 1933.    W. E. RYDER ET AL    1,919,532
INSULATING COVERING
Filed Jan. 4, 1929    2 Sheets-Sheet 2
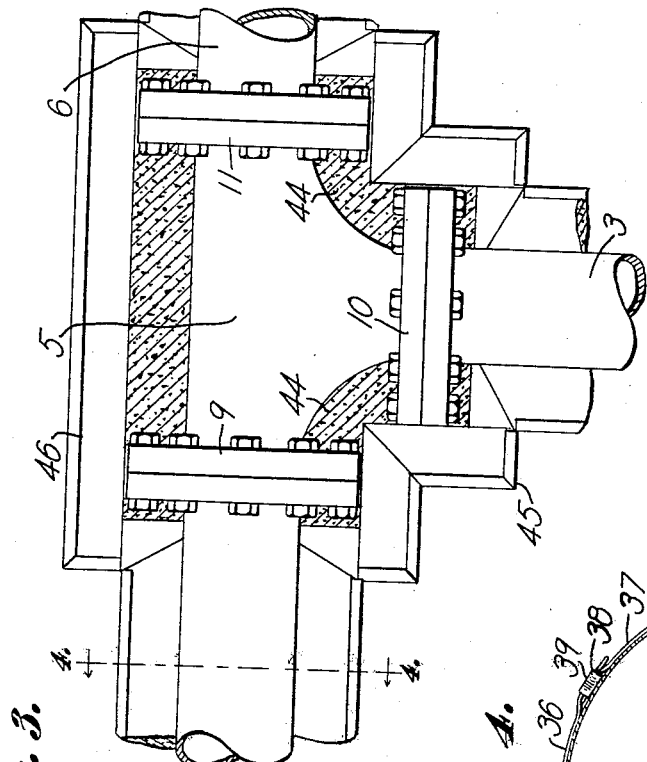
INVENTORS
Willard E. Ryder.
and Walter D. Reber.
BY
ATTORNEY Patented July 25, 1933

1,919,532

UNITED STATES PATENT OFFICE

WILLARD E. RYDER AND WALTER D. REBER, OF KANSAS CITY, MISSOURI, ASSIGNORS TO STANDARD ASBESTOS MANUFACTURING AND INSULATING CO., OF KANSAS CITY, MISSOURI, A CORPORATION OF MISSOURI

INSULATING COVERING

Application filed January 4, 1929. Serial No. 330,263.

Our invention relates to insulating materials and more particularly to relatively bulky and light weight insulating coverings for heated or cold surfaces such as pipes, pipe connections and the like, the principal objects of the invention being to increase the resistance of coverings of this character to heat, to reduce the liability to disintegration and deterioration of insulating coverings, to provide a covering that will not corrode or injuriously affect surfaces to which it is applied, and to reinforce and stiffen a covering for withstanding compression and contraction, whereby the life and efficient services of the covering may be prolonged.

Further objects of the invention are to provide preformed units of covering members for accurate fitting to heat-conductive surfaces, to assure uniform thickness for the units, and to segregate portions of loose insulating material in sealed compartments for preventing settling of the material and deterioration of insulating ability and like results.

The present invention is particularly adapted for covering conduits and containers that require occasional inspection, such as the pipes of cracking stills, and a further object of the invention therefore is to provide an insulating covering that may be readily removed to permit periodical inspection of conduits and containers.

In accomplishing these and other objects we have provided improved details of structure, the preferred forms of which are illustrated in the accompanying drawings, wherein:

Fig. 1 is a perspective view partly in section of our improved insulting covering installed on pipes and pie connections.

Fig. 2 is a perspective view of annular or ring-like sectional units of a covering for a curved pipe, such as an elbow, and shown in spaced relation.

Fig. 3 is a side elevation of a pipe line and connections equipped with our improved covering, the covering being shown partly in section, and the straight pipes fragmentarily.

Fig. 4 is a cross section on the line 4—4, Fig. 3, illustrating the formation of a segment for covering the pipe, and assembly and binding of complementary segments on a pipe.

Fig. 5 is a magnified fragmentary view of the section shown in Fig. 4.

Referring in detail to the drawings:

1 designates a straight cylindrical pipe with which right-angularly extending pipes 2 and 3 are connected by a pipe bend or elbow 4 and a T 5, a fourth pipe 6 being connected to the T in alignment with the pipe 1. Unions 7 and 8 for the elbow, and 9, 10 and 11 for the T, respectively, connect the same with the pipes, and comprise flanges on the abutting ends of the members.

The pipe line thus shown is illustrated for providing an example of elements to which our invention may be applied, it being understood that the insulating covering later described, may be adapted for covering elements otherwise shaped and connected, and having curved or flat surfaces, and requiring a nonconductive covering for one or more surfaces to prevent either escape or absorption of heat.

The invention will first be described as applied to a covering for the straight pipe 1, and includes a unit 12 adapted to encircle the pipe, and comprising a plurality of preformed complementary segments such as a pair of substantially semi-circular segments 13 and 14, for mounting on the pipe with their edges 15 in abutting relation.

A segment comprises a sheet or membrane 16 forming an inner concave wall or face conforming to the contour of the pipe, an outer membrane 17 also preferably curved and having greater length than the inner membrane and forming an outer wall, radial webs or ribs 18 forming the abutting edge faces of the segments, and intermediate ribs 19, (Figs. 1 and 2) comprising dividing walls and forming a plurality of compartments or cells such as 20 and 21 in which loose insulating filler 22, of the class including rock wool, mineral wool, slag wool, diatomaceous earth, zonalite, and asbestos fiber, is installed and supported.

The membranes 16 and 17 together form a shell covering the outer periphery, edges, and pipe-engaging inner periphery of a segment.

The membranes 16 and 17, the butt face walls 18, and dividing ribs 19 are composite members as later particularly described.

For convenience a preferred form of segment for producing a unit for a straight pipe will be described with reference to Fig. 4, wherein stiffening end ribs and cell-forming ribs, retaining walls, and reinforcing shell are clearly shown.

The intermediate ribs 19 are double walls, and preferably comprise sheets of fibrous insulating material such as asbestos felt bent and formed to produce the compartments to receive the filler, the sheets having integral circumferentially extending portions such as 23 and 24 constituting the bottoms or floors of oppositely opening compartments and connecting the adjacent ends or edges of the dividing walls. The continuously extending walls and floors produce open tops 25 and 26 of adjacent compartments presented alternately toward the axis and the outer periphery of the segment.

The end ribs 18 comprise preferably the filler-retaining walls of the end compartments of a segment, and are continuous with the inner and outer semi-cylindrical walls 16 and 17 of the segment, which close the open tops of the compartments and engage the outer surfaces of the compartment floors. The end walls may be integral with the enclosing membranes. The loose insulating material is thus divided into small portions supported by relatively stiff walls, and the radial ribs further confer substantial rigidity on the semi-cylindrical segments.

The continuous character of the sheets comprising a plurality of dividing ribs confers additional sealing ability on the walls, and also confers additional ability to resist compression.

Further details of the composite character of the shell-forming membranes 16 and 17, the edge walls 18, and cross ribs or dividing walls, are illustrated in Fig. 5, and will be particularly described with reference to said figure.

Coats such as 27 are applied to the inner or facing surfaces of the shell-forming membranes 16 and 17, and similar coats 28 to the outer surfaces of these membranes, for sealing and stiffening the shell, and comprise preferably a cement-like body adapted to cause engaged surfaces of sheet-like elements to adhere to each other. The coats consist of a heat-resistant composition provided in suitable form such as liquid or plastic for convenient application and assembly of elements, comprising high temperature silicate of soda and a refractory cement, and including a refractory material such as fire clay or soapstone, the cement preferably being of the type obtained by electrical heat treatment of finely graded silica sands.

Similar coats 29, 30 and 31 are applied to surfaces of the sheet-like elements in the process of forming the segments, and similar coats to the outer surfaces of the membranes, so that each wall, rib and membrane is enclosed in a skin that adheres thereto. Coats of the character indicated may be formed of any desired thickness to effect desired stiffening of the walls, and provide a skeleton or frame work for supporting the loose material and resisting influence of compression and similar strains.

A shield 32 is mounted on each segment, conforming to the outer surface thereof, and having inturned flanges 33 at each edge adapted to overlie the edges of the segment and engage the wall portions 18 of the shell, for latching the shield to the segment, the flanges extending radially over portions of the segment edges.

When complementary segments are positioned on a pipe, the flanges of the shields are engaged and space the facing edges of the segments, and the spaces are filled with gasket-like portions 34 of insulating material.

A unit including a pair of complementary segments in the illustrated application of the invention is secured to the pipe by a binding member 35 which encircles the unit and holds the segments in close engagement with the pipe and with each other, the insulating efficiency of the units being enhanced by the gasket-like portions 34 of insulating material located between facing edges of the segments.

The binder 35 may consist of any suitable material, and preferably comprises a metal member adapted to encircle the unit and having ends 36 and 37 adapted to be latched together, the form of binder illustrated being a strap or band tightly drawn into place, the two ends being secured, the one to the other in overlapping relation by a preformed clip 38 which is preferably swaged or crimped into place, as at 39, the crimping operation swaging the overlapping portions of the ends 36 and 37 coincidently and securely latching the ends to the clip, thus making the band substantially integral with the clip in crimped position of the latter.

It is to be understood that the segments and units are formed suitably for the member they are to cover. When the member is a curved pipe, wedge-shaped units 40 (Figs. 2 and 3) are provided, and the shields 41 therefore are wedge-shaped, one end of a shield registering with the similar end of the unit, while the other end registers at the narrow point of the unit with the similar end thereof, but is tapered outwardly toward the head of the wedge to form a projecting flange 42 for overlapping and engaging an adjacent unit, as indicated in Fig. 3.

Units such as 40 are further differentiated from the units previously described for covering straight pipe, by being adapted for adjustment to the flanges by which pipes are joined having suitable diameter to encircle the flanges. When the covering is installed, filling material, preferably rock wool, is packed around the flanges to form a mass designated 43, and segments of units 40 are provided to conform to the shape and diameter of the mass.

Similarly a body 44 of insulating material is installed around a T and flanges thereof, and segments such as 45 and 46 are provided for mounting on the body to encircle the flanges and adjacent pipe portions and cover the T.

One end of a unit may be formed with a conical boss 47, and an end-abutting unit may have a conical recess 48 in one end to receive the boss, whereby the abutting units may be more closely engaged to enhance the sealing character of the assembled covering.

The end 49 of one segment may be offset from the end 50 of a complementary segment with which it is in edge engagement (Fig. 1), whereby interlocking relation of a series of units may be provided for.

In the use of a covering provided as described, the relatively loose insulating material in the units, divided into small portions, is supported by insulating walls, and prevented from settling, and the original insulating value of the material is thus preserved. The rib-like walls and floors of the compartments not only support and divide the loose material, but protect it from fluids, vapors and gas, thus preventing transfer of heat by convection through the units, and deterioration and disintegration of the material.

The coats above described serve the further purpose of assisting in the support of fibrous loose material, since fibres on the outer surface of a mass of loose material in a cell adhere to the cementitious inner coat thereof and tend to support fibres in the interior of the mass among which the first-named fibres extend.

The coats, being fireproof and high resistant to high temperatures, protect and strengthen the fibrous sheets such as asbestos felt comprising the webbing, ribs or skeleton of the segments, and enhance the effectiveness and extend the like of the non-conducting segments.

What we claim and desire to secure by Letters Patent is:

1. In an insulating cover of the character described, a segment comprising spaced walls, spaced webs each comprising a plurality of superposed sheets of material bent back and forth to form connected ribs for supporting the walls in spaced relation, and a sealer comprising cementitious material having heat-resistant qualities located between the said superposed sheets to connect the sheets and form spaced ribs having double thickness.

2. An insulating covering including spaced outer and inner walls forming a shell, a pair of sheets forming a web and having opposite portions engaged with said walls and intermediate portions forming a rib to space the walls, and cementitious material including a refractory cement and a refractory filler located between said sheets and having substantial thickness to provide a stiffening coat within the rib.

3. In an insulating covering including spaced outer and inner walls forming a shell, a pair of sheets forming a continuous web and having opposite portions engaged with the side walls and intermediate portions forming ribs to space the side walls and form adjacent compartments on opposite sides of said web, and cementitious material including a refractory cement and a refractory filler located between said sheets and having substantial thickness to provide a stiffening coat within the ribs.

4. In an insulating covering of the character described, a segment comprising spaced walls, spaced webs each comprising a plurality of superposed sheets of material extended back and forth between the supporting walls to form adjacent compartments on opposite outer sides of the sheets, a filler of insulating material located in the compartments, and a sealer comprising cementitious material having heat-resistant qualities located between the said superposed sheets to connect the sheets and form spaced ribs having double thickness.

WILLARD E. RYDER.
WALTER D. REBER.